United States Patent [19]

Hinrichs

[11] 4,293,116

[45] Oct. 6, 1981

[54] METALLIC SEAT ASSEMBLY FOR VALVES

[75] Inventor: John M. Hinrichs, Bryan, Tex.

[73] Assignee: ACF Industries, Incorporated, New York, N.Y.

[21] Appl. No.: 77,076

[22] Filed: Sep. 19, 1979

Related U.S. Application Data

[63] Continuation of Ser. No. 214, Jan. 2, 1979, abandoned.

[51] Int. Cl.$^3$ ............................................. F16K 25/00
[52] U.S. Cl. .................................... 251/173; 251/174; 251/306; 251/315
[58] Field of Search ............... 251/173, 174, 315, 316, 251/317, 306; 277/206 R

[56] References Cited

U.S. PATENT DOCUMENTS 2,783,106  2/1957  Barnhart ....................... 277/206 X

FOREIGN PATENT DOCUMENTS 1010118  11/1965  United Kingdom ................ 251/173

*Primary Examiner*—Harold W. Weakley
*Attorney, Agent, or Firm*—Eugene N. Riddle; Marvin J. Marnock

[57] ABSTRACT

A valve seat assembly adapted to fit within an annular groove in a butterfly valve body. The seat assembly includes a pair of opposed metal seat rings generally L-shaped in cross section with overlapping outer legs seated and anchored in the bottom of the groove. The seat rings have flexible free inner end portions extending radially inwardly of the groove terminating at outwardly curled arcuate ends which contact the sealing surface of the valve disc and extend laterally of the groove in spaced relation to and over the adjacent valve body. A resilient soft seal is mounted between the metal seat rings and the sides of the metal seal rings are corrugated to grip and retain the soft seal in place. The end portions of each metal ring have a relatively long free length and are easily flexed laterally and radially outwardly of the valve body by contact with the outer periphery of the disc when the disc is moved to a closed position to maintain sealing contact with the disc without requiring a high operating torque.

20 Claims, 9 Drawing Figures

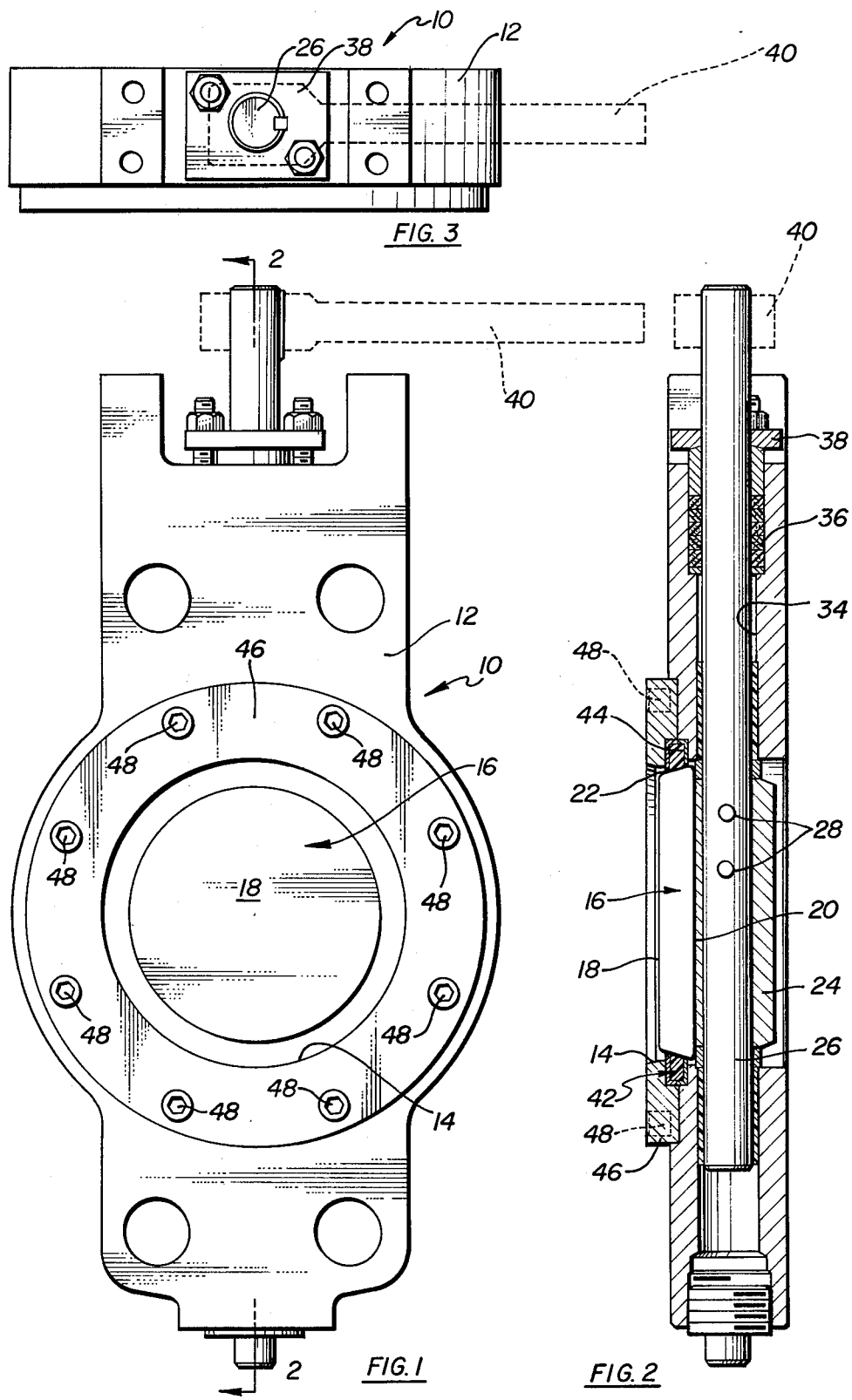

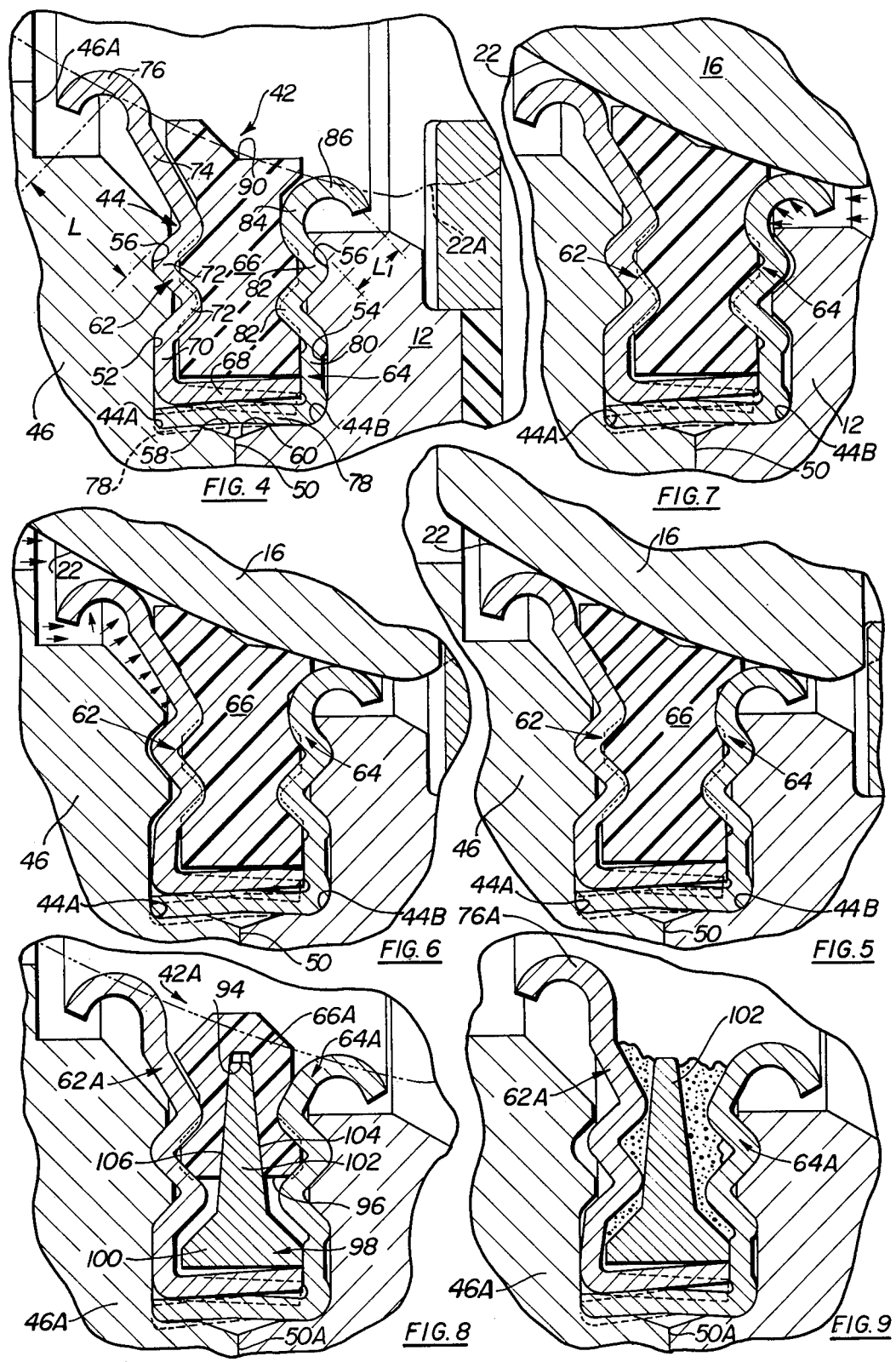

METALLIC SEAT ASSEMBLY FOR VALVES

This is a continuation of pending patent application Ser. No. 000,214, filed Jan. 2, 1979, now abandoned.

BACKGROUND OF THE INVENTION

As shown in U.S. Pat. No. 4,113,268 dated Sept. 12, 1978, a sealing assembly for a butterfly valve is illustrated in which a soft primary seal is positioned between a pair of spaced metal secondary seals. The secondary metal seals are held out of contact with the seating surface of the butterfly disc by the soft seal under normal operating conditions. Only when the soft primary seal is destroyed do the secondary metal seals engage the disc in sealing relation. A separate resilient backing ring urges the primary soft seal and the secondary metal seals inwardly toward the seating surface of the disc.

U.S. Pat. No. 4,162,782, issued July 31, 1979 to Ronald D. Wilkins and filed Apr. 10, 1978 for "Seal Assembly for Butterfly Valve" discloses a seal assembly mounted in an annular groove about the flow passage. The seal assembly includes a metallic body having a pair of outer legs seated in the bottom of the groove and a pair of inner legs contacting the outer periphery of the valve disc. A soft seal is positioned between the inner legs and the inner ends of the inner legs contact the valve disc to provide metal sealing surfaces. Upon contact with the disc, the inner legs are urged radially outwardly. However, the inner legs do not have a large radial movement and a substantial frictional force is provided by contact with the inner legs upon radially outward movement which increases the operating torque for moving the valve between open and closed positions. With certain types of metal finishes or coatings on the valve disc, some scratching of the sealing surface on the valve disc might occur with a high frictional contact, particularly if the seal has a so-called knife edge metal contact surface.

DESCRIPTION OF PRESENT INVENTION

The seat assembly of the present invention comprises a combination metal and elastomer seat which is tight sealing, pressure and temperature responsive, and will continue to provide controlled seating in the event the soft elastomer seal is destroyed such as by fire or the like.

A primary object of this invention is to provide a seat assembly which will accommodate a wide variation in seal contact with the valve disc while maintaining a tight seal without appreciable increases in the operating torque for the opening and closing of the valve disc.

A further object of the invention is a valve seat design which is highly flexible and moves radially outwardly and laterally outwardly upon contact with the valve disc thereby to follow the sealing contour of the valve disc under all conditions of operation and to maintain a tight sealing contact therewith.

The seat assembly of the present invention comprises an outer metal housing fitting within an annular groove in the body with free unrestrained inner end portions extending radially inwardly beyond the groove, the end portions having curled or arcuate ends extending in a direction generally laterally of the groove and terminating at a position laterally spaced from the groove. The inner end portions of the metal housing have a substantial free length which makes the inner end portions highly flexible for moving radially inwardly and radially outwardly a substantial amount thereby to follow the sealing contour of the valve disc as the disc moves into and out of a closed position under all conditions of operation. The curled or arcuate ends of the free end portions thus maintain a line sealing contact with the disc during and after radial deflection, both inwardly and outwardly. A resilient soft seal is carried by the metal housing between the end portions and engages in sealing relation the valve disc.

The adjacent sealing surface of the butterfly valve disc is usually tapered or chamfered and fluid pressure acting against the face of the disc at the closed position thereof will move the valve disc around, for example, 0.020 inch in the downstream direction. It is noted that the present valve is a bidirectional valve and functions with fluid flow in either direction. Thus, the seat assembly must be adapted to adjust for variations in tolerances and for movement of the valve disc in a downstream direction from either direction of flow. The highly flexible unrestrained inner end portions of the present seat assembly provide sealing contact adjacent the sealing surface of the adjacent valve disc under such conditions of operation without appreciably increasing the operating torque for moving the valve between open and closed positions. It is highly desirable to maintain a low operating torque for moving the closure member between open and closed positions and the upstream free end portion of the seat assembly must be sufficiently flexible to respond to upstream pressure and of sufficient length to follow the disc without losing sealing contact since a downstream movement of the tapered valve disc away from the upstream end portion reduces the disc diameter at seat contact. In contrast, the downstream end portion of the seat assembly must be sufficiently flexible to expand radially outwardly to accommodate a tighter engagement without causing the operating torque for moving the closure member to increase substantially. The upstream end portion of the seat assembly has an inner diameter smaller than the inner diameter of the downstream end portion and an unrestrained free length longer than the free length of the downstream end portion in the normal direction of fluid flow.

Another feature of the present design is in the return of the resilient or elastomeric soft seal after the valve disc is opened by the deflected free length of the flexible upstream end portion. When the upstream end portion returns to its undeflected free position, it forces the soft seal back to its original uncompressed position. This minimizes the effect of cold flow and creep in the soft seal which is present in many soft elastomers such as polytetrafluoroethylene.

BRIEF DESCRIPTION OF THE DRAWINGS

FIG. 1 is an end elevation of the butterfly valve structure which incorporates the seat assembly comprising the present invention;

FIG. 2 is an enlarged section taken generally along the line 2-2 of FIG. 1;

FIG. 3 is a top plan of the butterfly valve shown in FIGS. 1 and 2;

FIG. 4 is an enlarged cross sectional view of the seat assembly comprising the present invention showing the seat assembly in a free unrestrained position at the open position of the closure member;

FIG. 5 is an enlarged sectional view similar to FIG. 4 but showing the seat assembly in a deflected position with the valve closure member shown in a closed position in contact with the free inner end portions of the seat assembly;

FIG. 6 is a cross sectional view similar to FIG. 5 but showing the seat assembly in the closed position of the closure member with upstream pressure applied from the left as shown in FIG. 6 and with the valve disc moved downstream slightly;

FIG. 7 is a cross sectional view similar to FIG. 6 but showing fluid pressure applied from the right as viewed in FIG. 7;

FIG. 8 is a cross sectional view of a modified form of the invention in which a metal spacer is positioned between the sides of the metal seat structure to provide rigidity to the seat assembly upon destruction of the soft seal; and FIG. 9 is a cross sectional view of the embodiment shown in FIG. 8 with the resilient soft seal destroyed.

Referring now to the drawings for a better understanding of the invention and more particularly to the embodiment shown in FIGS. 1–7, the butterfly valve structure is indicated generally at 10 and comprises a body 12 having a flow passage 14 therethrough. A butterfly valve disc indicated generally at 16 is mounted within the flow passage for moving between open and closed positions and comprises a front face 18, a rear face 20, and an outer peripheral sealing surface 22 extending about the outer periphery of valve disc 16 and forming a generally spherical sealing surface. Rear face 20 has an integral sleeve 24 and a shaft 26 fitting within sleeve 24 is secured by suitable pins 28 to sleeve 24 for connecting valve disc 16 for rotation with shaft 26. The axial rotation of shaft 26 is offset a distance from the center line of disc 16, and may, for example, be around 0.060 inch for a disc having a diameter of six (6) inches. Body 12 has a bore 34 receiving shaft 26. Packing material is illustrated at 36 and a packing retainer nut 38 engages and compresses packing material 36. A suitable handle 40 indicated at broken lines is secured to the upper end of shaft 26 for rotation of disc 16 between open and closed positions.

The seat assembly comprising the present invention is illustrated generally at 42. Seat Assembly 42 fits in an annular groove 44 formed at joint 50 between the main body portion of body 12 and a removable annular retainer ring or plate 46. Screws 48 threaded into internally threaded openings in body 12 hold retainer plate 46 in tight engagement with seat assembly 42. Groove 44 has sides 52 and 54 which are generally parallel but have indentations or corrugations formed therein at 56. The bottom of groove 44 is defined by tapered surface 58 on retainer ring 46 and adjacent tapered surface 60 on the main body portion of body 12.

Seat assembly 42 fits within groove 44 and has an outer metal body or housing comprising an upstream seat ring generally indicated at 62 and a downstream seat ring generally indicated at 64 which are generally L-shaped in cross section. A soft resilient face seal is indicated at 66 positioned between upstream seat ring 62 and downstream seat ring 64. Upstream seat ring 62 comprises a lower leg 68 and a side 70 having corrugations or indentations 72 therein which nest within the indentations in the adjacent side 52 of groove 44. Upstream seat ring 62 has a free unsupported length "L" forming end portion 74 and extending to the contact line of seat ring 62 with the sealing surface 22 of valve disc 16. An outwardly curled or arcuate end 76 of end portion 74 engages in sealing line contact the adjacent sealing surface 22 of disc 16 at closed position.

Downstream seat ring 64 has a lower leg 78 and a side 80 with corrugations 82 therein which nest with adjacent indentations in side 54 of groove 44. Downstream seat ring 64 has a free unsupported length indicated at "L1" forming on end portion 84 which terminates at an outwardly curled or arcuate end 86 in metal-to-metal sealing contact with the adjacent surface 22 of disc 16.

It is noted that the free length "L" of upstream seat ring 62 is around twice the length of the free length "L1" of downstream seat ring 64. When the valve is initially installed, pressure acting on the disc or closure member 16 tends to deflect or move the disc in a downstream direction due to tolerances and the like. For example, with a six inch diameter disc, the disc will move downstream around 0.020 inch. Therefore, upstream seat ring 62 should be sufficiently flexible to respond to this pressure differential and be of a sufficient length to follow in sealing contact the sealing surface 22 of disc 16 without losing contact with sealing surface 16. Since sealing surface 22 is generally spherical, movement in a downstream direction of disc 16 from the left viewing FIGS. 4–6 reduces the diameter of disc 16 at seat contact. Thus, seat ring 62 should be capable of deflecting radially inwardly which reduces the inside diameter of ring 62 but yet arcuate end 76 must maintain sealing contact with surface 22.

It is to be understood that valve structure 10 is bidirectional and fluid pressure may act against disc 16 from either direction. In the event that fluid pressure is acting against the downstream side from the right viewing FIGS. 4–7, valve disc 16 may move to the left around 0.020 inch. When this occurs, the sealing contact surface 22 of disc 16 engaging arcuate end 76 increases the disc diameter at end 76 and seat ring 62 must expand radially outwardly to accommodate surface 22 and without causing the operating torque for opening and closing the valve to increase substantially. When valve structure 10 is initially assembled, the initial deflection of upstream seat ring 62 is around twice that of downstream seat ring 64. The amount of the initial deflection is in relation to the total free unsupported length of the respective end portions 74 and 84.

Soft face seal 66 is preferably formed of a soft elastomeric material, such as nylon or polytetrafluoroethylene, and has an indentation in its outer face at 90 which will receive foreign matter or the like therein which adheres to the adjacent sealing surface 22 of valve disc 16. Soft seal 66 has indentations therein which nest with the corrugations in seat rings 62 and 64 and is tightly gripped thereby.

Before assembly, upstream seat ring 62 and downstream seat ring 64 are snapped together with soft seal 66 therebetween. The outer diameter of upstream seat ring 62 formed by leg 68 is slightly greater than the inner diameter of downstream seat ring 64 formed by leg 78 so a tight snap fit is provided. Leg 78 of seat ring 64 is flared outwardly in its free position prior to insertion within groove 44 as shown in broken lines in FIG. 4. With retainer ring 46 removed, the assembly is inserted within groove 44 and then retainer ring 46 is inserted with leg 78 contacting tapered surface 58 and being urged radially inwardly to provide a spring loaded static seal. The width of groove 44 is slightly less than the width of leg 78 and when seat retainer 46 is inserted and screws 48 tightened, a metal-to-metal pressure responsive seal is formed at the corners of grooe 44 indicated at 44A and 44B since leg 78 is compressed and bowed radially inwardly slightly by the sides of groove 44 to provide the seals at corners 44A and 44B which prevent any leakage through joint 50 formed by retainer ring 46 and body 12.

As upstream seat ring 62 is flexible and has a smaller diameter than the diameter of disc 16, the back surface of sealing surface 22 is contoured as shown at 22A to provide a gradual taper for contacting end 76 as the disc 16 is rotated to a fully closed position thereby to gradually urge end 76 of upstream seat ring 62 radially outwardly and laterally outwardly without pinching end 76. Retainer 46 has a recess at 46A receiving end 76 of upstream seat ring 62 to protect end 76 from the line flow thereby allowing seat ring 62 to relax and expand radially to its original position once disc member has been moved out of contact engagement with disc 16.

As shown in FIG. 5 when the valve disc 16 is in a closed position, pressure from the upstream side acts on the underside of seat ring 62 urges arcuate end 76 into tight metal-to-metal sealing engagement with the adjacent sealing face 22 of disc 16. The downstream movement of end portion 76 squeezes soft seal 66 into engagement with the sealing surface 22 of disc 16. This is particularly advantageous in the event soft seal 66 has permanent deformation resulting from cold flow or creep as end portion 74 will force soft seal 66 to its original uncompressed position when disc 16 is opened and end portion 74 returns to its undeflected position. When soft seal 66 is destroyed by high temperatures, such as fire or the like, arcuate ends 76 and 86 of metal seat rings 62 and 64 maintain metal-to-metal sealing contact with the adjacent sealing surface 22 of disc 16. Also fluid seals are maintained at corners 44A and 44B which prevents leakage at point 50 from either direction of flow.

Referring now to FIGS. 8 and 9, a separate embodiment of the invention is disclosed in which a soft seal 66A has an annular groove 94 along its rear face 96. A metal spacer member indicated generally at 98 has a base 100 and an extension 102 with tapered sides or surfaces 104 and 106. Extension 102 fits within groove 84 and tapered surfaces 104 and 106 urge seal 66A outwardly to aid in retaining soft seal 66A in position between upstream seat ring 62A and downstream seat ring 64A. Upstream seat ring 62A and downstream seat ring 64A are identical to respective seat rings 62 and 64 of the embodiment shown in FIGS. 4-7. Spacer members 98 supports seat rings 62A and 64A in the event of the destruction of seal 66A. As shown in FIG. 9, with seal 66A destroyed upstream seat ring 62A is urged by very high pressure at the closed position of disc 16 against the tapered surface 106 and extension 102 thus provides a support for seat ring 62A to maintain tight metal-to-metal sealing relation with the adjacent sealing surface 22 of disc 16. Any increase in pressure results in an increased contact force from end 76A against the adjacent sealing surface 22 of disc 16. The seat assembly indicated generally at 42A of the embodiment shown in FIGS. 8 and 9 is assembled in the same manner as the embodiment shown in FIGS. 4-7 but with spacer member 98 being inserted upon the initial assembly of rings 62A and 64A.

According to the present invention, the metal seat rings by having a free unsupported length formed by the end portions are able to expand radially to conform to the sealing contour of the closure member or valve disc even though variations in the diameter of disc 16 may occur, and this is obtained without any appreciable increase in the opening torque for opening and closing the valve disc. Seat rings 62 and 64 are made of a relatively thin metal material which is preformed with arcuate ends that are radially expandable when forced into engagement with the disc. Even under repeated usage of the valve structure, the flexible end portions will contract or move radially inwardly when the valve is moved to an open position. Thus, a very effective sealing assembly is provided which minimizes any necessity of extremely close tolerances on the seat rings as well as the disc or closure member. The arcuate ends permit a line sealing contact with the adjacent closure member even though the arcuate ends may move laterally outwardly and radially in either direction. This also permits the deflection in the valve disc from the upstream pressure which moves the valve disc downstream.

As an example, with a butterfly valve structure having a diameter of around six (6) inches, downstream seat ring moves radially outwardly around 0.012 inch while the upstream seat ring moves radially outwardly around 0.020 inch. The thickness of seat rings 62 and 64 is around 0.030 inch to maintain the desired flexibility which is necessary or inherent in a design of the type illustrated. The butterfly valve structure may operate under relatively high fluid pressures such as 1500 to 2000 psi, for example.

What is claimed is:

1. A seat assembly adapted to fit within an inner annular groove in a valve body having a closure member with a peripheral sealing surface movable between open and closed positions, said seat assembly comprising an annular metal housing having spaced inner end portions extending radially inwardly beyond the groove and a base portion at the bottom of the groove, each end portion flaring laterally outwardly of the groove and terminating at an end spaced laterally of the groove; and a resilient soft seal mounted within the metal housing between the spaced inner end portions at a location to seal with said peripheral sealing surface in the closed position of the closure member, each end portion having a free unrestrained length and being flexible in both a radial direction and a lateral direction, each end portion adapted to contact in metal-to-metal sealing relation the adjacent peripheral sealing surface of the closure member when the closure member moves to a closed position and to be flexed radially and laterally outwardly by the closure member to maintain a tight sealing relation therewith.

2. A seat assembly as set forth in claim 1 wherein said outer metal housing comprises a pair of separate metal seat rings being generally L-shaped in cross section with outer legs of the seat rings being in lapped relation and forming the base portion of the metal housing at the bottom of the groove.

3. A seal assembly as set forth in claim 1 wherein said outer metal housing comprises a pair of separate seat rings having corrugated sides gripping the soft seal to retain the soft seal within the housing.

4. A seat assembly adapted to fit within an inner annular groove in a butterfly valve body having a valve member movable between open and closed positions, said seat assembly comprising a pair of metallic seat rings having legs seated in the bottom of the groove and having sides positioned adjacent opposed groove sides, each seat ring having a flexible inner end portion extending radially inwardly beyond the groove and terminating at an arcuate end extending laterally of the groove in spaced relation to and lapping the adjacent valve body;

a resilient soft seal mounted between the metallic seat rings, and means to retain the soft seal between the seat rings, the soft seal and the arcuate ends of both seat rings being in simultaneous sealing contact relation with the valve member in the closed position thereof, said end portions being flexed both radially and laterally outwardly when initial contact is made with the valve member when moved to closed position and being in sealing contact with the valve member in the closed position thereof under all conditions of operation, said arcuate ends when exposed to fluid pressure in the closed position of the valve member being urged into tight sealing relation with the valve member.

5. A seat assembly as set forth in claim 4 wherein the sides of the seat rings are corrugated and grip the soft seal therebetween to define said means to retain the soft seal.

6. In a valve including a valve body, a valve chamber, a flow passage communicating with the valve chamber, an annular groove about the flow passage, and a valve member with a peripheral sealing surface mounted in said valve chamber for movement between open and closed positions relative to the flow passage;

an improved seat assembly fitting within the annular groove, said seat assembly comprising a metal housing seated within the groove and having spaced inner end portions extending radially inwardly beyond the groove, and a resilient soft seal mounted within the metal housing between the spaced inner end portions at a location to seal against said peripheral sealing surface in the closed position of the valve member;

each end portion having a free unrestrained length and an end flaring laterally outwardly of the groove in lapping relation to the adjacent valve body, each end portion being flexible in both radial and lateral directions and contacting in metal-to-metal sealing relation the adjacent peripheral sealing surface of the valve member when the valve member moves to a closed position.

7. A butterfly valve comprising:

a valve body having a flow passage therethrough, a butterfly disc mounted in the flow passage for movement between open and closed positions and having a peripheral sealing surface, an annular groove in the valve body about the flow passage;

an improved seat assembly seated within the annular groove, said seat assembly including a metal housing having spaced inner end portions extending radially inwardly beyond the groove and a resilient soft seal mounted within the metal housing between the spaced inner end portions at a location to seal with said peripheral sealing surface in the closed position of the disc, each end portion having an end extending laterally outwardly of the groove in lapping relation to the adjacent valve body, each end portion being flexible in both radial and lateral directions with the end thereof contacting in metal-to-metal sealing relation the peripheral sealing surface of the valve disc under all conditions of operation when the valve disc is in closed position.

8. In a butterfly valve including a valve body, a valve chamber, a flow passage communicating with the valve chamber, an annular groove about the flow passage, and a butterfly disc mounted in said valve chamber for movement between open and closed positions relative to the flow passage and having a tapered peripheral sealing surface;

an improved seat assembly fitting within the annular groove, said seat assembly comprising a metal housing seated within the groove having spaced inner end portions extending radially inwardly beyond the groove, and a resilient soft seal mounted within the metal housing between the spaced inner end portions;

each end portion having a free unrestrained length and an arcuate curled end flaring laterally, each end portion being flexible in both radial and lateral directions and the arcuate end thereof contacting in metal-to-metal sealing relation the adjacent peripheral sealing surface of the valve disc when the disc moves to a closed position.

9. In a butterfly valve as set forth in claim 8 wherein the metal housing comprises a pair of separate metal seat rings being generally L-shaped in cross section with outer legs of the seat rings being snapped together in an overlapping relation and the soft seal being positioned between sides of the seat rings thereby to form the seat assembly.

10. In a butterfly valve as set forth in claim 9 wherein the leg of the outermost seat ring is of a width slightly greater than the width of the groove and is squeezed between the sides of the groove at the bottom corners thereof upon insertion of the seat assembly within the groove thereby bowing said legs radially inwardly and forming seals at the corners of the groove.

11. A butterfly valve comprising:

a valve body having a flow passage therethrough, a butterfly disc mounted in the flow passage for movement between open and closed positions and having a peripheral sealing surface, an annular groove in the valve body about the flow passage difining a bottom and generally parallel spaced sides forming corners at the junctures with the bottom;

an improved seat assembly within the annular groove, said seat assembly comprising a pair of metallic seat rings generally L-shaped in cross section having legs seated in the bottom of the groove and having sides positioned adjacent opposed groove sides, each seat ring having a flexible inner end portion extending radially inwardly beyond the groove and terminating at an arcuate end extending laterally of the groove in spaced relation to and lapping the adjacent valve body;

a resilient soft seal mounted between the metallic seat rings, and means to retain the soft seal between the seat rings, the soft seal and the arcuate ends of both seat rings being in simultaneous sealing contact relation with the valve member in the closed position thereof, said end portions being flexed both radially and laterally outwardly when initial contact is made with the valve member when moved to closed position and being in sealing contact with the valve member in the closed position thereof under all conditions of operation, said arcuate ends when exposed to fluid pressure in the closed position of the valve member being urged into tight sealing relation with the adjacent sealing surface of the valve member.

12. A seat assembly as set forth in claim 11 wherein the sides of the seat rings are corrugated and grip the soft seal therebetween to define said means to retain the soft seal.

13. A butterfly valve as set forth in claim 11 wherein a separate metal spacer member is mounted between the seal rings radially outwardly of the soft seal and in contact with the soft seal, said spacer member upon destruction of the soft seal maintaining a spacing between the sides of the seat rings.

14. A butterfly valve as set forth in claim 11 wherein the leg of the outermost seat ring is of a width slightly greater than the width of the groove and is squeezed between the sides of the groove at the corners thereby bowing said leg radially inwardly and forming metal static seals at the corners of the groove.

15. A butterfly valve having a main body portion with a flow passage therethrough, a seat retainer of ring removably secured to the main body portion at a joint therebetween, a butterfly disc mounted in the flow passage for movement between open and closed positions, an annular groove about the flow passage at the joint between the retainer ring and main body portion, said groove defining a bottom and generally parallel spaced sides forming corners with the bottom; and an improved seat assembly in the groove;

said seat assembly comprising a pair of metal seat rings being generally L-shaped in cross section with outer legs of the seat rings being in overlapped seated relation at the bottom of the groove and sides of the seat rings being positioned adjacent the spaced groove sides;

said retainer ring pressing said seat rings tightly against the sides of the groove, the sides of said seat rings having end portions engaging the butterfly disc in metal-to-metal sealing relation under all conditions of operation when the disc is in a closed position.

16. A butterfly valve as set forth in claim 15 wherein the leg of the outermost seat ring is of a width slightly greater than the width of the groove and is squeezed between the sides of the groove at the corners thereof to bow the outermost leg radially inwardly and form metal static seals at the corners of the groove 17. A butterfly valve as set forth in claim 16 wherein a portion of the groove bottom is tapered to urge the leg of the outermost seat ring inwardly upon positioning of the retainer ring in position.

18. In a butterfly valve including a valve body, a valve chamber, a flow passage communicating with the valve chamber, an annular groove about the flow passage, said groove defining a bottom and generally parallel spaced sides, and a butterfly disc mounted in said valve chamber for movement between open and closed positions relative to the flow passage and having a tapered peripheral sealing surface;

an improved seat assembly anchored within the annular groove, said seat assembly comprising a pair of generally L-shaped metal seat rings having outer legs in an overlapped seated relation at the bottom of the groove and having integral sides positioned adjacent the spaced groove sides;

said seat rings each having an inner end portion, each of said inner end portions having a free unrestrained length extending radially inwardly beyond the groove and terminating at a laterally extending end, the ends of said inner end portions being spaced from each other and extending laterally in opposite directions, each inner end portion being flexible in both radial and lateral directions and the end thereof being adapted to contact in face-to-face sealing relation the adjacent peripheral sealing surface of the valve disc.

19. In a butterfly valve having a valve body with a flow passage therein and an internal annular groove in the body about the flow passage, and a butterfly valve disc mounted within the flow passage for pivotal movement between open and closed positions and having a peripheral sealing surface positioned adjacent the groove in said closed position; an improved seat assembly comprising:

a pair of seat rings anchored in the groove defining an upstream seat ring and a downstream seat ring, each ring having a side positioned adjacent a different one of the opposed groove sides, each seat ring having a flexible inner end portion extending radially inwardly beyond the groove and terminating at an arcuate end extending laterally of the groove in spaced relation to and lapping the adjacent valve body, the inner end portions of the seat rings being spaced from one another and flaring laterally outwardly in opposite directions;

the arcuate ends of both seat rings being in simultaneous sealing contact relation with the peripheral sealing surface of the valve disc in the closed position thereof, said end portions being flexed both radially and laterally outwardly when initial contact is made with the valve disc upon movement to closed position and being in face-to-face sealing contact with the valve disc in the closed position thereof, the arcuate end of the upstream seat ring when exposed to fluid pressure from the flow passage in the closed position of the valve disc being urged by said fluid pressure into tight face-to-face sealing relation with the peripheral surface of the valve disc.

20. In a valve including a valve body, a valve chamber, a flow passage communicating with the valve chamber, an internal annular groove about the flow passage, and a valve member mounted in said valve chamber for movement between open and closed positions relative to the flow passage and having a tapered peripheral sealing surface;

an improved seat assembly anchored within the annular groove and including a pair of seat rings having spaced inner end portions for providing a dual seal with said tapered peripheral sealing surface;

each of said inner end portions having a free unrestrained length outside the groove extending radially inwardly beyond the groove and terminating at a laterally extending end, one of the inner end portions having a substantially larger free unrestrained length than the other of said inner end portions, the ends of said inner end portions being spaced from each other and extending laterally in opposite directions, the inner end portions being flexible in both radial and lateral directions whereby the ends thereof are in simultaneous face-to-face sealing relation with the adjacent peripheral sealing surface of the valve member in the closed position thereof.

* * * * *